(12) United States Patent
Pallini et al.

(10) Patent No.: US 7,686,087 B2
(45) Date of Patent: Mar. 30, 2010

(54) RAPID MAKEUP DRILLING RISER

(75) Inventors: Joseph W. Pallini, Tomball, TX (US); Scott I. Stewart, Houston, TX (US); Steve M. Wong, Houston, TX (US); Daniel L. Havelka, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 0 days.

(21) Appl. No.: 11/750,708

(22) Filed: May 18, 2007

(65) Prior Publication Data

US 2007/0267197 A1 Nov. 22, 2007

Related U.S. Application Data

(60) Provisional application No. 60/801,667, filed on May 19, 2006.

(51) Int. Cl.
  *E21B 17/01* (2006.01)
(52) U.S. Cl. .................. 166/367; 166/338; 166/345; 166/359; 285/322; 285/920; 285/81
(58) Field of Classification Search ............ 166/367, 166/345, 350–356; 175/5; 405/224.2–224.4; 138/109; 285/322, 920, 81
See application file for complete search history.

(56) References Cited

U.S. PATENT DOCUMENTS

| | | | | |
|---|---|---|---|---|
| 3,096,999 A | * | 7/1963 | Ahlstone et al. | 166/340 |
| 4,433,859 A | * | 2/1984 | Driver et al. | 285/34 |
| 4,491,346 A | * | 1/1985 | Walker | 285/18 |
| 4,693,497 A | * | 9/1987 | Pettus et al. | 285/12 |
| 4,902,044 A | * | 2/1990 | Williams et al. | 285/18 |
| 5,456,321 A | * | 10/1995 | Shiach et al. | 166/382 |
| 5,535,827 A | * | 7/1996 | Graff et al. | 166/368 |
| 5,634,671 A | * | 6/1997 | Watkins | 285/18 |

(Continued)

FOREIGN PATENT DOCUMENTS

WO   WO 02/36932 A1   5/2002

OTHER PUBLICATIONS

U.S. Appl. No. 11/508,689, filed Aug. 23, 2006, Fraser, et al.
Vetco Gray Inc., MUSL External Tieback Connector Drawing.

*Primary Examiner*—Thomas A Beach
*Assistant Examiner*—Matthew R Buck
(74) *Attorney, Agent, or Firm*—Bracewell & Giuliani

(57) ABSTRACT

A connector for connecting sections of drilling riser pipe wherein a first riser contains a pin assembly with an external first grooved profile and a second riser contains a housing assembly. An internal split pivoting latch segment assembly carried by the housing assembly contains a second grooved profile adapted to mate to the first grooved profile and a split actuation ring movably carried by the housing assembly forces the second grooved profile of the latch segment assembly into engagement with the first grooved profile of the pin assembly. A plurality of retraction links engage an upper edge of the latch segment assembly to disengage the second grooved profile of the latch segment assembly from the first grooved profile of the pin assembly if the risers are to be disconnected.

22 Claims, 6 Drawing Sheets

U.S. PATENT DOCUMENTS

| | | | |
|---|---|---|---|
| 6,129,149 A * | 10/2000 | Beall | 166/344 |
| 6,234,252 B1 * | 5/2001 | Pallini et al. | 166/345 |
| 6,260,624 B1 * | 7/2001 | Pallini et al. | 166/345 |
| 6,293,343 B1 * | 9/2001 | Pallini et al. | 166/345 |
| 6,609,734 B1 * | 8/2003 | Baugh | 285/322 |
| 6,824,171 B2 * | 11/2004 | Milberger et al. | 285/123.13 |
| 7,331,395 B2 * | 2/2008 | Fraser et al. | 166/345 |
| 2003/0141718 A1 * | 7/2003 | Bilderbeek | 285/348 |
| 2004/0163816 A1 * | 8/2004 | Nelson et al. | 166/340 |
| 2006/0196673 A1 * | 9/2006 | Pallini et al. | 166/368 |

* cited by examiner

RAPID MAKEUP DRILLING RISER

CROSS-REFERENCE TO RELATED APPLICATION

This application claims priority to provisional application 60/801,667, filed May 19, 2006.

FIELD OF THE INVENTION

This invention relates in general to high pressure riser systems with surface or near surface blowout preventers and more particularly to a high strength, high preload, rapid makeup connector for such riser systems.

DESCRIPTION OF THE PRIOR ART

A drilling riser is a large diameter pipe used in offshore drilling operations to guide the drill string from the offshore platform to and from the subsea wellhead and to provide means for circulation of drilling fluid. The drill string is lowered through the drilling riser. Drilling fluid circulates down from the platform through the drill string, out through the drill bit, and returns to the platform in the space between the inner diameter of the riser and outer diameter of the drill string. Environmental forces caused by waves, currents and the movement of the offshore platform as well as internal forces caused by the weight of the heavy drilling fluids all contribute to the substantial loads applied to the drilling riser. Additionally, high pressure drilling risers, utilizing surface blowout preventors, may be exposed to fill well bore pressure. The connection between each successive joint of drilling riser must be able to withstand such loads.

The prior art makes up the riser pipe or joint connections with bolted flange type connectors or with radially oriented screws that move dogs into and out of engagement with a profile on the riser pipe. Both of these methods require manipulation with a wrench or stud tensioning device, placing personnel in close proximity to the drilling slots for prolonged periods of time, and increasing the danger level of performing the task.

Normally, these connectors and the riser pipe need withstand only fairly low pressure, such as 2000 psi, because the blowout preventer is located subsea on top of the wellhead assembly. A recent approach is to mount the blowout preventer on the vessel and make the riser of sufficient strength to handle much higher internal pressure, such as 10,000 psi. The connection between the individual riser pipes must be able to withstand this high pressure.

Improvements to this prior art are desired which would allow for the connection between the riser pipes to be made rapidly and more safely, while at the same time generating high preload, able to withstand significant design separation loads.

SUMMARY OF THE INVENTION

The present invention is directed to a device for connecting risers which can withstand high pressure and provides both a high strength and low fatigue connection, such as drilling risers or completion risers. A connector having the features of the present invention would generally be used for riser systems that utilize a surface blowout preventer, but is also suitable for use on risers using subsea blowout preventors.

The connector of the present invention comprises a pin assembly that is attached to the end of a first riser pipe and a housing assembly that is attached to the end of a second riser pipe that is to be connected with the first riser pipe. The housing assembly contains an internal split pivoting latch segment assembly. One end of each latch segment contains a grooved profile that mates with a corresponding external profile on the pin assembly. The other end of the latch assembly engages an internal shoulder of the housing assembly The housing assembly has a sufficiently large cavity to allow the latch segments to pivot between the open and engaged positions.

In order to secure the first riser pipe to the second riser pipe, a split actuation ring is repositioned inside the cavity of the housing assembly, forcing the profile of latch segment into engagement with the profile of the pin assembly by rotating the latch segments. The actuation ring is positioned by a series of load transfer blocks that are moved axially by a drive sleeve, which resides on the outside of the housing assembly. Alternatively, the load transfer blocks may directly act on the latch segments. The load transfer blocks travel in slots or windows that are milled into the housing assembly. Split actuation ring retainers hold the actuation ring in place. Retaining screws attach both the actuation ring retainer and actuation ring to the load transfer block. The drive sleeve may be controlled by an actuation device built in to a riser spider system. Seals and gaskets of the connector prevent leakage of fluid between the interior of the riser and the surrounding environment, the entry of sea water into the connector, and prevent high pressure bore fluid from passing into the cavity within the housing assembly.

A retraction link is carried on the box, which rotates about a curved surface within the housing assembly and, contains a lip which engages an upper edge of latch segment. In order to release the first riser pipe from the second riser pipe, the actuation ring is repositioned by the load transfer blocks that are moved by a drive sleeve. When the split actuation actuation ring retainer makes contact with the retraction link, the retraction link rotates and engages the edge of the latch segment, moving the latch segment into the open position. As a result, the profile of the latch segment disengages from the profile of the pin. In an alternative configuration, the load transfer blocks directly engage the retraction link.

The connection is compressively preloaded by providing a relatively shallow load flank angle to the profile of the latch segment and to the corresponding profile of the pin. The magnitude of preloading should be sufficient such that if the maximum projected tensile load is applied to the first and second riser joint, the faces of the connecting parts do not separate from the gasket. The preload would thus he sufficient to maintain a sealed connection under expected working loads of the joint sections.

One embodiment of the present invention may also include an automatic connector actuation lock. This actuation lock ensures that the drive sleeve does not move unexpectedly during operations and can lock the drive sleeve in both the open or engaged position. In particular, the actuation lock will ensure that the drive sleeve remains in open position while bringing the riser joints together and in the engaged position during working conditions. The actuation lock is composed of two concentric split rings, a smaller diameter ratchet ring and a larger diameter back-up ring, both located within a cavity in the drive sleeve. The ratchet ring has a thread profile on its inner diameter that corresponds to a thread profile on the outside diameter of the housing assembly. The ratchet ring has a profile on its outer diameter that corresponds to a profile on the inner diameter of the back-up ring. When the spider engages the riser pipe, a handling tool engages the drive sleeve and depresses a series of radial pins in the drive sleeve, which force the back-up ring to reduce in diameter and to move upward. This in turn provides clearance for the ratchet ring to expand and move axially over the threads of the outer diameter on the housing assembly. When the spider is disengaged, the radial pins retract, the back-up ring returns to its larger diameter, and the ratchet ring is unable to move axially, thereby locking the sleeve in place.

The benefits of this connector over the prior art is that this connector is designed for rapid make-up while at the same time generating high preload which is able to withstand significant design separation loads.

DETAILED DESCRIPTION OF THE INVENTION

Figure 1:
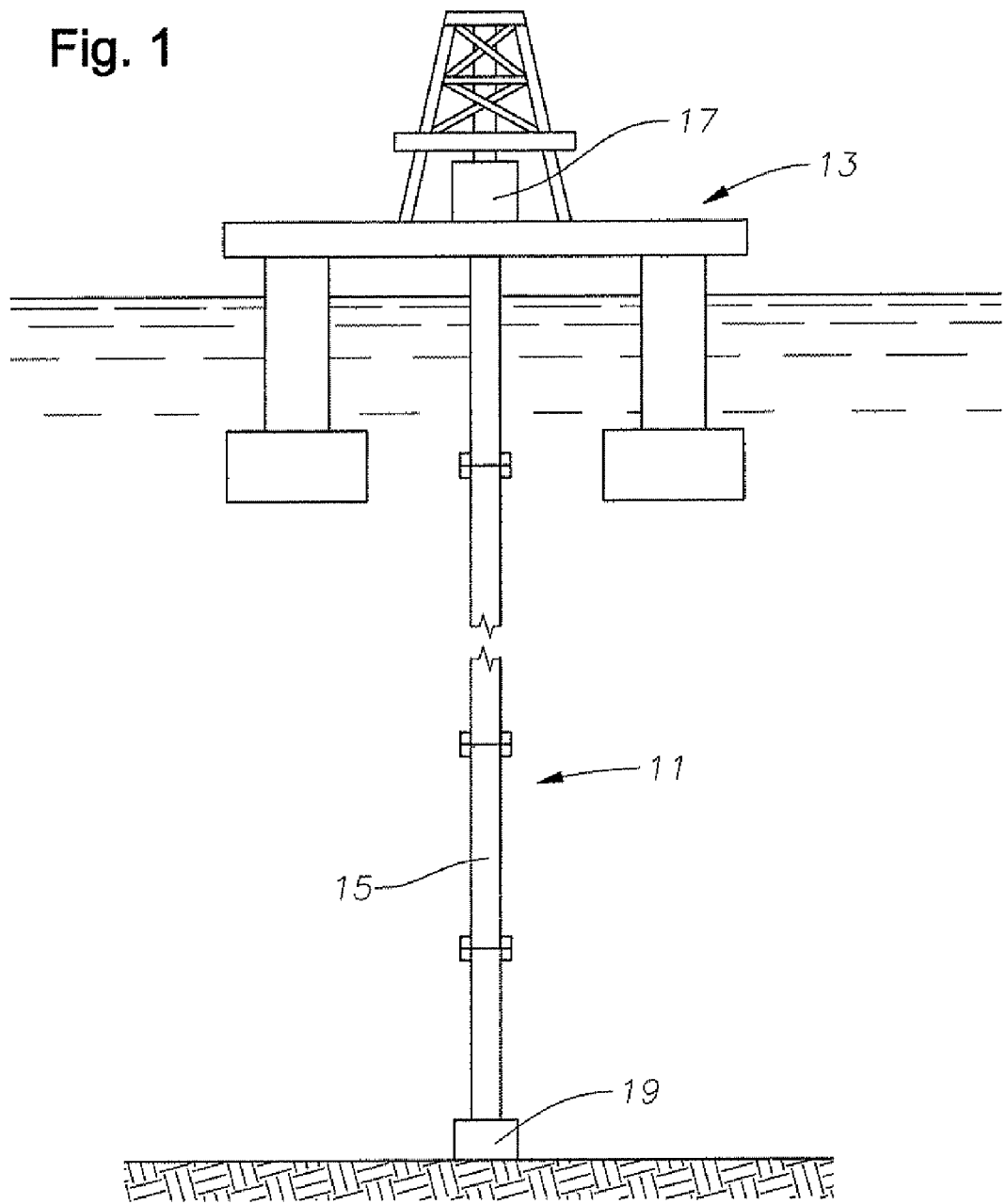
FIG. 1 is a schematic view illustrating a riser constructed in accordance with this invention.

Referring to FIG. 1, a riser 11 is schematically shown extending from a floating platform 13. Platform 13 is illustrated schematically and can be any type, such as a spar, tension leg platform, mobile offshore drilling unit, or the like. Riser 11 is a drilling riser used to drill offshore wells and is particularly for use in applications where the blowout preventer is located at the surface. The drilling riser may be submerged for several years at a time, such as for use on a spar platform. The drilling riser may also be recovered after drilling each well, such as on a tension leg platform.

Riser 11 is made up of a plurality of high pressure riser joints 15, each approximately 60 feet in length. A blowout preventer 17 is shown schematically at the upper end of riser 11. A subsea tieback assembly 19 is shown schematically at the lower end of riser 11 although blowout preventer 17 can also be at the lower end. Locating blowout preventer 17 at the platform or near the surface has significant advantages but in such a case riser 11 has to be able to withstand high internal pressure. Subsea tieback assembly 19 may incorporate a quick disconnect mechanism as well as a hydraulic connector on its lower end that connects it to a subsea wellhead assembly. Subsea tieback assembly 19 is not normally equipped to seal around drill pipe.

Figure 2:
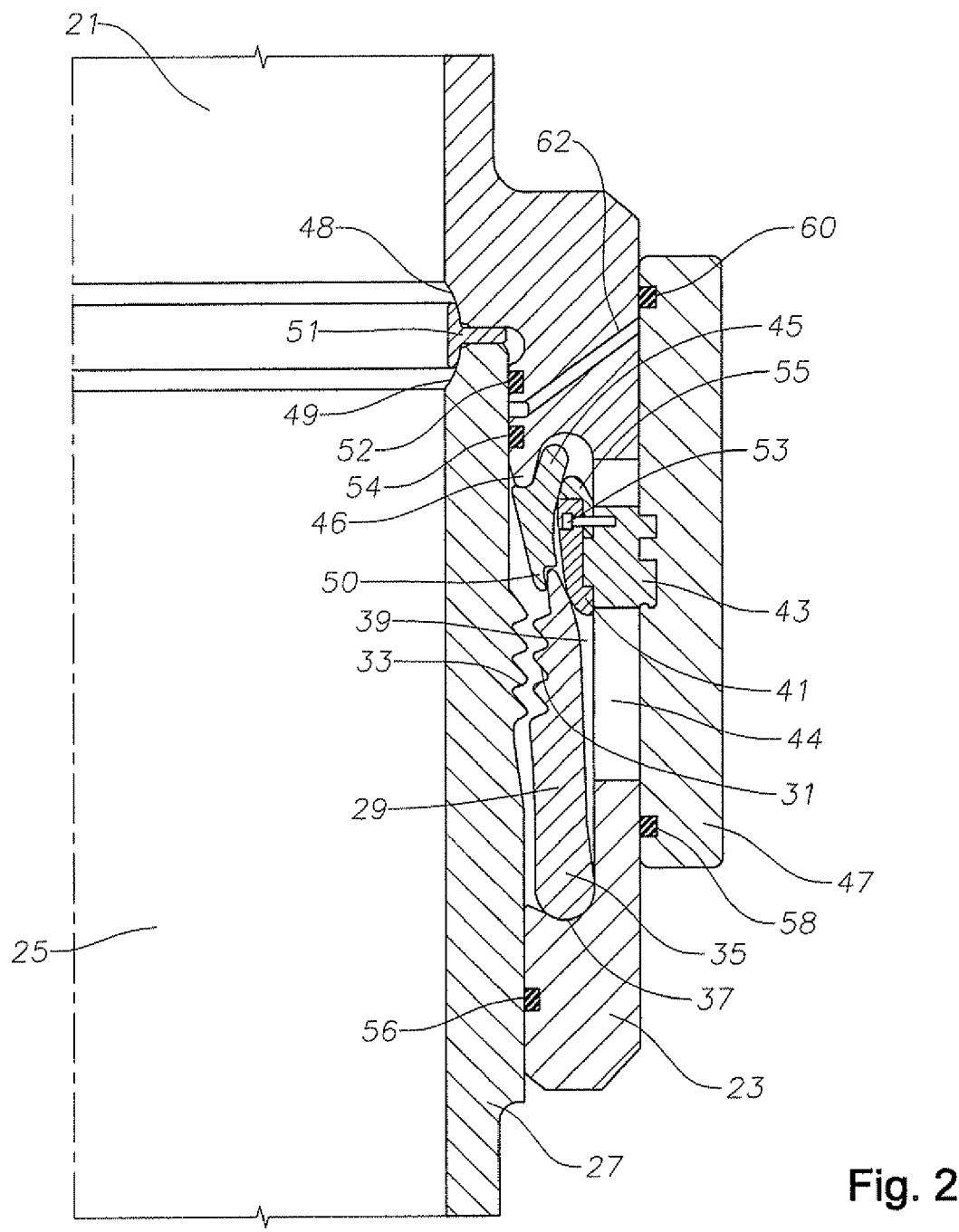
FIG. 2 is a sectional view of a connection system for a riser joint with a latch segment in the open position.

Referring to FIG. 2, a first high pressure drilling riser joint 21 is fitted with a housing assembly 23, referred to as a box, and a second high pressure drilling riser joint 25 is fitted with a pin assembly 27. Box 23 slides over pin 27. Box 23 contains an internal split pivoting latch segment assembly. Preferably the latch ring assembly combines a plurality of separate segments 29, for example twelve, spaced around box 23. One end of each latch segment 29 contains a grooved profile 31 that mates with a corresponding profile 33 on pin assembly 27. Profiles 31 and 33 may have a saw tooth pattern or an alternative pattern. A second end 35 of latch segment 29 engages a shoulder 37 of box 23. Second end 35 is a curved, convex surface and shoulder 37 is a curved concave shoulder. This arrangement allows latch segment 29 to rock between the open position of FIG. 2 and the engaged position of FIG. 3.

Figure 3:
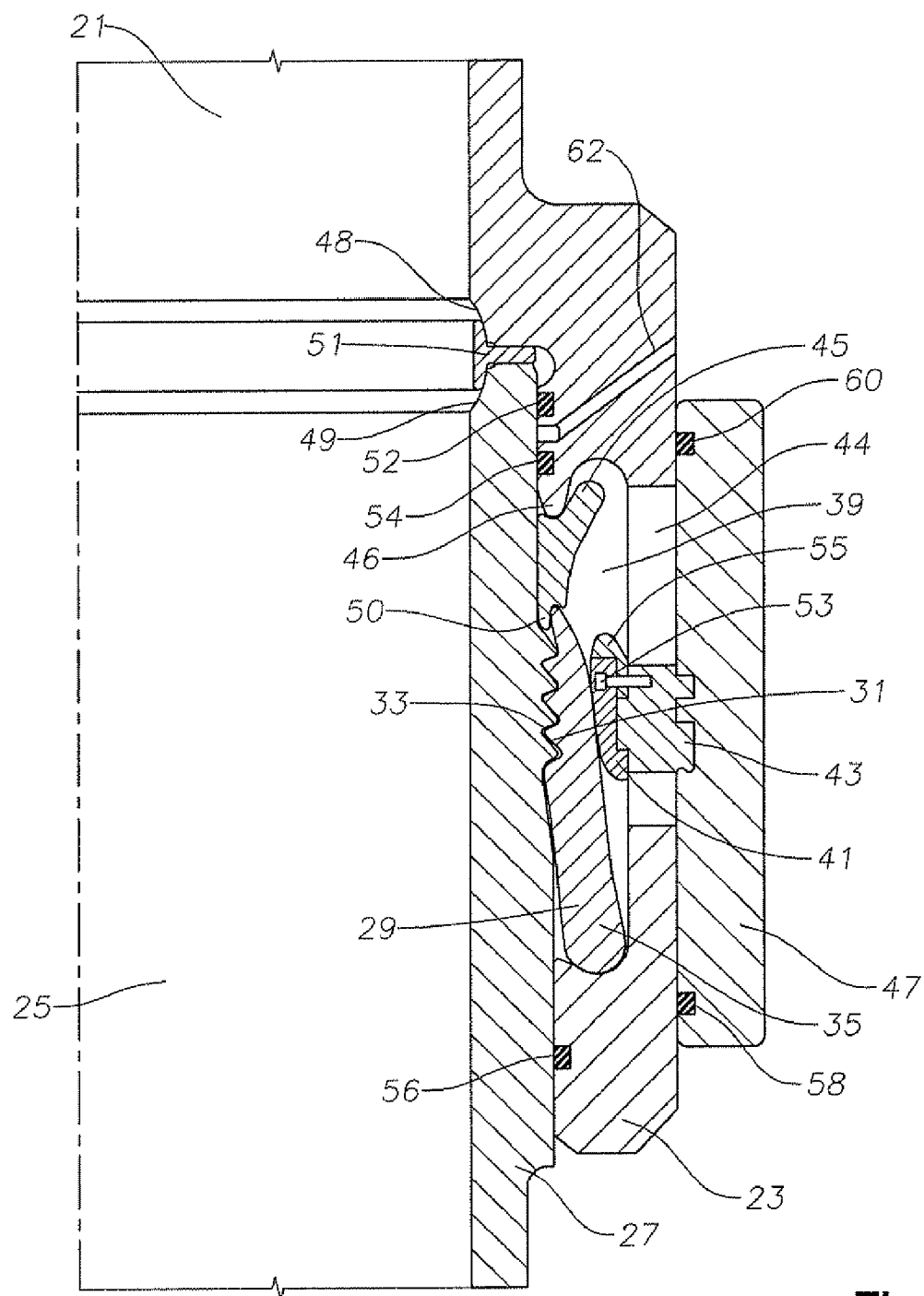
FIG. 3 is a sectional view of the connection system of FIG. 1 with the latch segment in the closed position.

Turning to FIG. 3, in order to secure riser 21 to riser 25, a split actuation ring 41 is repositioned inside cavity 39 of box 23, forcing profile 31 of latch segment 29 into engagement with profile 33 of pin 27 by rotating latch segment 29 about end 35. Actuation ring 41 has a curved convex inner side that slides along the convex outer surface of latch segment 29 as can be seen by comparing FIGS. 2 and 3. Actuation ring 41 may be fabricated in multiple segments that are then mated to create a full ring around the inner concave surface of cavity 39. The curvature of the convex inner surface of actuation ring 41 and the curvature of convex outer surface of latch segment 29 are such that as actuation ring 41 slides along the outer surface of latch segment 29, contact between the convex inner surface of actuation ring 41 and the convex outer surface of latch segment 29 is maintained. As latch segment 29 rotates about end 35, the relative angle between the outer surface of latch segment 29 and the inner surface of actuation ring 41 will change. The design of the curvature of both the inner surface of actuation ring 41 and outer surface of latch segment 29 must take this relative change into account to allow the surfaces to remain in contact.

Actuation ring 41 moves axially between the upper unlocked position of FIG. 2 and the lower locked position of FIG. 3. In this embodiment, actuation ring 41 is moved vertically by a series of load transfer blocks 43 that are moved axially by a drive sleeve 47, which resides on the outside of box 23. Drive sleeve 47 forms a complete ring around box 23, with the inner cylindrical surface of drive sleeve 47 matching the outer cylindrical surface of box 23. The number of load transfer blocks 43 corresponds to the number of latch segments 29 in this embodiment. The load transfer blocks 43 travel in slots or windows 44 that are milled into box 23. Actuation ring retainer 55 secures actuation ring 41 to load transfer block 43. Actuation ring retainer 55 is a split ring. A retaining screw 53 attaches actuation ring retainer 55 and the actuation ring 41 to each load transfer block 43. In an alternate configuration, transfer blocks 43 directly engage latch segments 29, and there is no need for the actuating ring or retainer. The drive sleeve 47 may be moved axially by an actuation device 85 built in to a riser spider system such as spider system 80 shown in FIG. 4. Spider system 80 is mounted on platform 13 and moves horizontally towards riser pipe 25 until upward facing surface 75 of vertical member 77 of spider system 80 is positioned such that it can support downward facing surface 79 of pin assembly 27. A handling tool has piston assembly 83 which is supported by spider system 80, and threaded adapter 87, which is located on top of piston assembly 83. Threaded adapter 87 contains actuation devise 85 which engages drive sleeve 47 and moves drive sleeve 47 axially by the action of piston assembly 83.

Returning to FIG. 3, when connected, conical seal face 48 of joint 21 and seal face 49 of joint 25 are pressed against either side of gasket 51. Gasket 51 prevents leakage of fluid between the interior of the riser and the surrounding environment. Seals 54 and 56 between box 23 and pin 27 seal cavity 39 against the entry of sea water. Seals 52, 54 additionally prevent high pressure bore fluid from passing into cavity 39. Seals 58 and 60 between drive sleeve 47 and box 23 prevent the entry of sea water into seal cavity 39 via the space between drive sleeve 47 and box 23. Box 23 contains a port 62 for testing seals 52 and 54, and for allowing leakage of high pressure bore fluids to vent before passing into cavity 39.

A plurality of retraction segments or links 45 are carried on pin 27 above profile 33. Each retraction link 45 has an upward facing curved concave surface which engages a curved convex surface 46 depending from box 23. This engagement allows retraction link 45 to pivot about the curved convex surface 46 of box 23. A lower side of retraction link 45 contains a lip 50 which engages an upper edge of latch segment 29. Actuation ring retainer 55 has a convex curved surface that engages the concave outer surface of each retraction link 45.

Referring again to FIG. 2, in order to release the first riser 21 from second riser pipe 25, actuation ring 41 is moved to the lower position by the load transfer blocks 43 that are moved axially by a drive sleeve 47. When actuation ring retainer 55 makes contact with retraction link 45, it causes retraction link 45 to rotate or pivot about convex surface 46. Lip 50 engages the upper edge of latch segment 29, pivoting latch segment 29 into the open position. As a result, profile 31 of latch segment 29 disengages from profile 33 of pin 27. Box 23 contains a sufficiently large cavity 39 to allow latch segment 29 to pivot into the open position and fully disengage from pin 27. In an alternative configuration, load transfer blocks 43 contact actuation rings 55 directly.

The curvature of the convex surface of actuation ring retainer 55 and the curvature of concave outer surface of retraction link 45 are such that as actuation ring retainer 55 slides along the outer surface of retraction link 45, contact between the surfaces is maintained. As retraction link 45 rocks or pivots about convex surface 46, the relative angle between the convex surface of actuation ring retainer 55 and the curvature of concave outer surface of retraction link 45 will change. The design of the curvature of both the convex surface of actuation ring retainer 55 and concave outer surface of retraction link 45 must take this relative change into account to allow the surfaces to remain in contact.

The connection is compressively preloaded by providing a relatively shallow load flank angle to profile 31 of latch segment 29 and to the corresponding profile 33 of pin 27. The magnitude of preloading should be sufficient such that if the maximum projected tensile load is applied to riser joint 21 and 25, face 48 of joint 21 and face 49 of joint 25 do not separate from gasket 51. The preload would thus be sufficient to maintain the contact between faces 48 and 49 and gasket 51 under expected working loads of the joint sections. The preloading forces are transmitted from joint 21 through box 23 and transferred to pin assembly 27 of joint 25 via the profiles 31 and 33.

In operation, when making up riser 11 for lowering into the sea, the operator makes sure that latch segment 29 is in the open position as shown in FIG. 2. The operator lowers a first riser joint 25 with the end of riser joint 25 containing pin assembly 27 pointed upwards and holds this riser joint in place with the riser spider system of platform 13. The operator then lowers a second riser joint 21, with box 23 pointed downward, landing box 23 of riser 21 over the pin assembly 27 of riser joint 25. The operator then actuates drive sleeve 47 by an actuation device built into the riser spider of platform 13, which moves load transfer blocks 43 downward, which in turn repositions actuation ring 41, forcing profile 31 of latch segment 29 into engagement with profile 33 of pin 27. When the operator is ready to install the next riser joint, he repeats this cycle. The operator can break out the riser joint of riser 11 by reversing the procedure.

Figure 4:
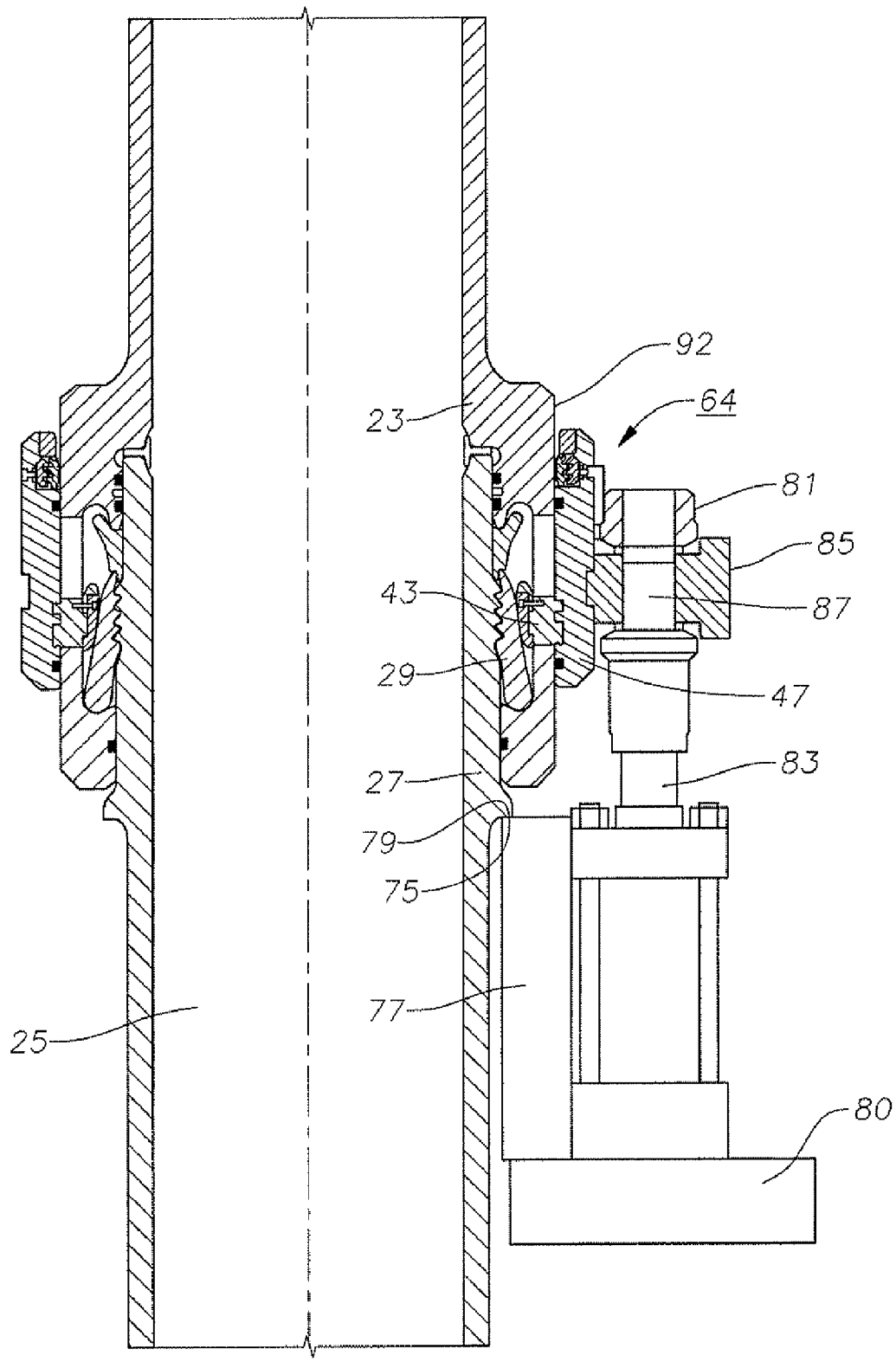
FIG. 4 is a schematic view illustrating a riser constructed in accordance with this invention, including the actuation lock.

Turning to FIG. 4, one embodiment of the present invention may also include an automatic connector actuation lock 64. Actuation lock 64 ensures that drive sleeve 47 does not move unexpectedly during operations. Actuation lock 64 can lock drive sleeve 47 in both the open or engaged position. In particular, the actuation lock will ensure that drive sleeve 47 remains in the engaged position during working conditions, and the open position while bringing the joints together during installation.

Figure 5:
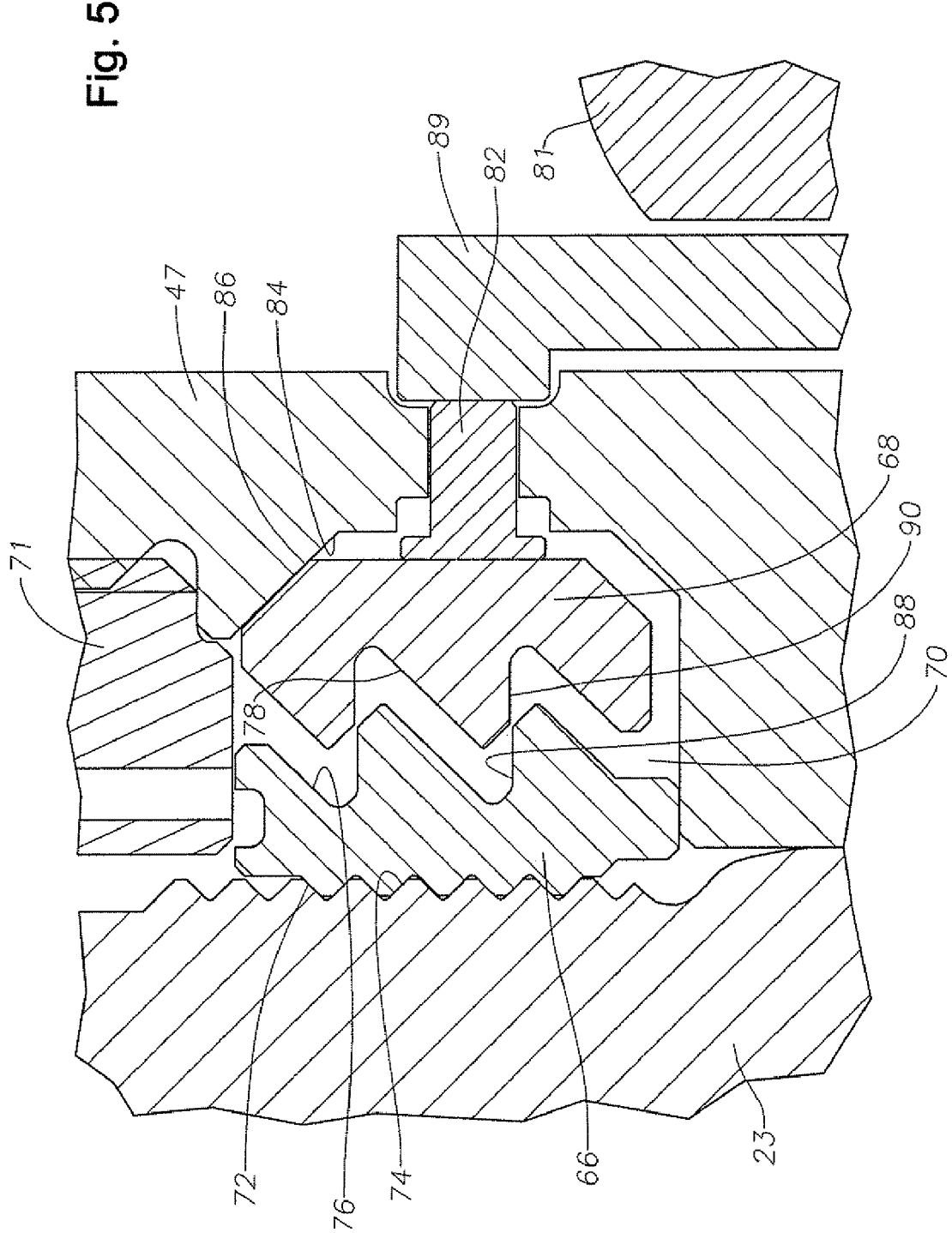
FIG. 5 is a schematic view illustrating the actuation lock in the open position.

Actuation lock 64 is composed of two concentric split rings, comprising a smaller diameter ratchet ring 66 and a larger diameter back-up ring 68, both located within cavity 70 in drive sleeve 47, as can be seen in FIG. 5. A threaded ring 71 secures to drive ring 47 to define the upper end of cavity 70. Ratchet ring 66 has a groove profile 72 on its inner diameter that corresponds to groove profile 74 on the outside diameter of box 23. Ratchet ring 66 is biased inward to engage profile 74. Ratchet ring 66 has groove profile 76 on its outer diameter that corresponds to groove profile 78 on the inner diameter of back-up ring 68. Back-up ring 68 is outwardly biased.

When riser actuation device 85 engages drive sleeve 47 (FIG. 4), engagement member 81 of threaded adapter 87 engages peg member 89 of threaded adapter 87 depresses a plurality of pins 82 spaced radially around and carried on drive sleeve 47, which force back-up ring 68 to reduce in diameter. Cavity 70 of drive sleeve 47 has a downward sloping shoulder 84 which remains in contact with the upward sloping surface 86 of back-up ring 68 such that as back-up ring 68 reduces in diameter, it also moves upward along downward facing shoulder 84. The upward movement of back-up ring 68 aligns outer profile 76 with profile 78 on the inner diameter of back-up ring 68 such that the upward facing flanks 88 of profile 76 of ratchet ring 66 do not interfere with the downward facing flanks 90 of profile 78 of back-up ring 68. This alignment of profiles 76 and 78 allows ratchet ring 68 to expand and contract and move axially over threads 74 of the outer diameter of box 23 as drive sleeve 47 is moved either upwards or downwards.

Figure 6:
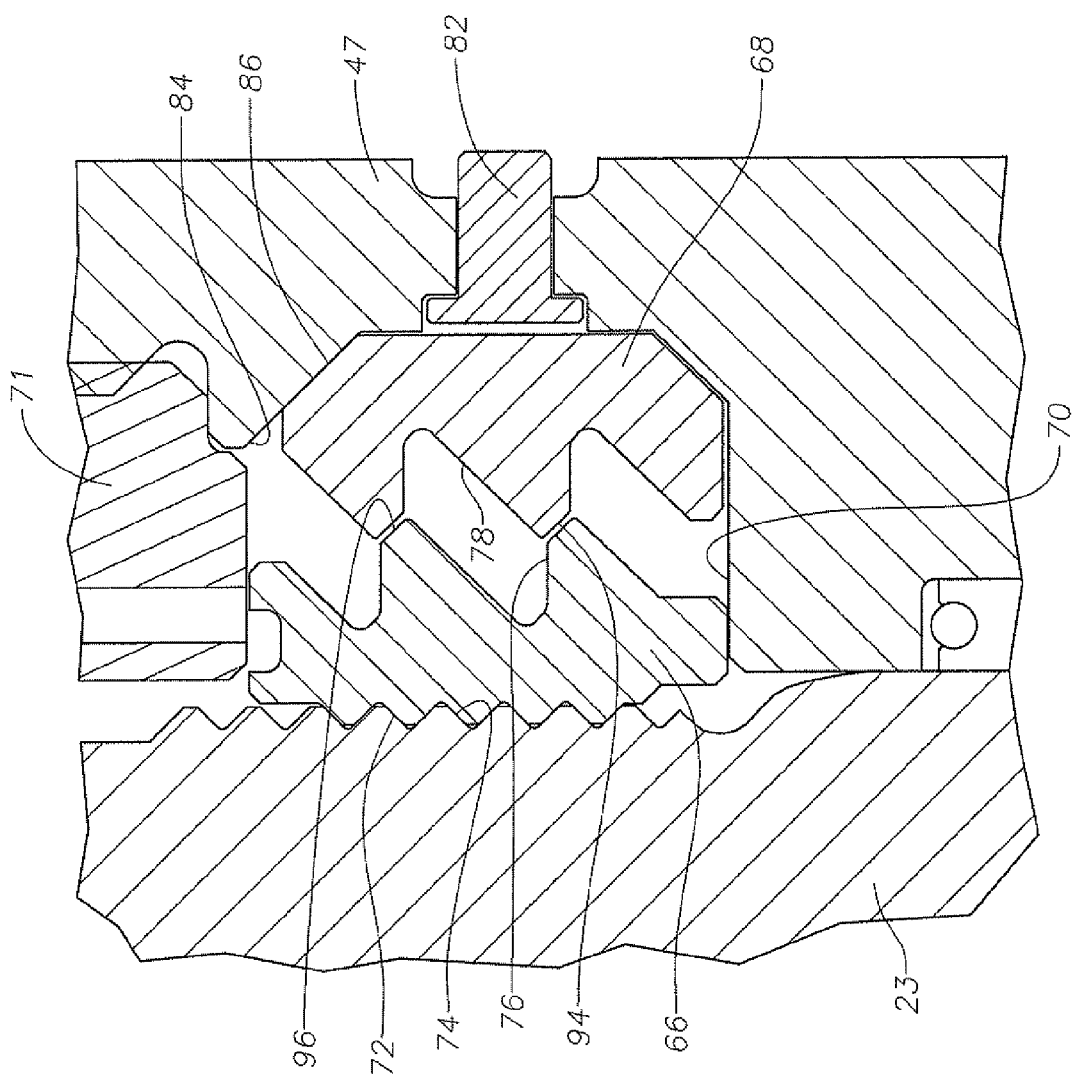
FIG. 6 is a schematic view illustrating the actuation lock in the locked position.

Groove profile 72 on ratchet ring 66 engages groove profile 74 on the outside diameter of box 23 when drive sleeve 47 is in the locked position (FIG. 6). When drive sleeve 47 is in the unlocked position (FIG. 5), groove profile 72 on ratchet ring 66 engages a profile 92 (FIG. 4) on the outside diameter of box 23 spaced above profile 72. While engaging profile 92, ratchet ring 66 holds drive sleeve 47 in the unlocked position.

When threaded adapter 87 is removed, turning now to FIG. 6, pins 82 retract from cavity 70 causing back-up ring 68 to expand and take on a larger diameter. As back-up ring 68 moves outward, downward sloping shoulder 84 of cavity 70 remains in contact with the upward sloping surface 86 of back-up ring 68, forcing back-up ring 68 to move downward. When back-up ring 68 is in the outer and lower position, face 94 of profile 78 lines up with face 96 of profile 76 and ratchet ring 66 is unable to expand. As a result, profile 74 of box 23 engages profile 72 of ratchet ring 66 and ratchet ring 66 unable to move axially, locking drive sleeve 47 in place.

The invention has significant advantages. The coupling provides a high preload which is necessary for long, high pressure riser strings. The coupling can be quickly made-up and broken out with an automated handling tool. Personnel are not placed in exposed positions while the riser is being made-up or broken out. The assembly and retrieval of a riser is less time consuming than in the prior art.

The present invention has been described with reference to several embodiments thereof. Those skilled in the art will appreciate that the invention is thus not limited, but is susceptible to variation and modification without departure from the scope and spirit thereof For example, box 23 and pin 27 could be connected with the pin facing upward or downward. The lock could be used with connectors other than one using a pivoting latch assembly.

We claim:

1. A connector for connecting sections of riser pipe, the connector comprising:
   a pin with an external profile on one end of a first riser pipe;
   a housing assembly on a second end of the first riser pipe, the housing assembly being adapted to receive the pin of an adjacent riser pipe, the housing assembly having a window extending through the housing assembly from the exterior of the connector to the interior of the housing assembly;

an internal split pivoting latch segment assembly carried by the housing assembly and having a profile adapted to engage the profile on the pin of the adjacent riser pipe to connect the housing assembly to the pin of the adjacent riser pipe, the latch segment assembly having a support end that is pivotally supported on a shoulder of the housing assembly;

an actuation member disposed within the housing assembly for axial movement in a first direction relative to the latch segment assembly to pivot the latch segment assembly from an unlatched position to a latched position to force the grooved profile of the latch segment assembly into engagement with the profile of the pin of the adjacent riser pipe; and a drive assembly extending from a location external to the housing assembly though the window of the housing assembly to the actuation member within the housing, the drive assembly being adapted to enable a device external to the housing assembly to engage the drive assembly mechanically to move the actuation member axially in the first direction.

2. The connector according to claim 1 further comprising a retraction link pivotally carried by the housing assembly in engagement with an end of the latch segment assembly opposite the support end, the retraction link pivoting in response to axial movement of the actuation member in a second direction to disengage the profile of the latch segment assembly from the profile of the pin.

3. The connector according to claim 2 wherein the actuation member has a curved convex side that slides along a curved concave outer surface of the retraction links, said curved surfaces designed such that contact between the curved surfaces is maintained as the actuation ring retainers are moved.

4. The connector according to claim 1 wherein the latch segment assembly comprises a plurality of separate segments spaced around the housing assembly.

5. The connector according to claim 1 wherein the actuation member has a curved convex inner side that slides along a curved convex outer surface of the latch segment assembly, said curved surfaces configured such that contact between the curved surfaces is maintained as the actuation member is moved axially in the first direction.

6. The connector according to claim 1, wherein the drive assembly comprises:
 a drive member carried on an outside of the housing assembly for axial movement relative to the housing assembly;
 a load transfer block disposed in the window to couple the actuation member to the drive member; and
 a seal assembly adapted to form a seal between the housing assembly and the drive member around the window as the drive member is moved axially relative to the housing assembly.

7. The connector according to claim 1 wherein the housing assembly comprises:
 an annular member having an inner diameter and an annular cavity formed in the inner diameter; and
 the latch segment assembly is carried in the annular cavity.

8. The connector according to claim 7 wherein the actuation member is carried in the annular cavity.

9. The connector according to claim 1 wherein the window in the housing assembly extends transverse to the axis of the housing assembly.

10. A riser connection system comprising:
 a plurality of riser pipes, each of the riser pipes having a pin containing an external profile on a first end and a housing on a second end, the housing being adapted to receive a pin of an adjacent riser pipe;
 an internal split pivoting latch segment assembly carried within the housing and having a profile that mates with the external profile on the pin of an adjacent riser pipe to latch the riser pipe to the adjacent riser pipe, the latch segment assembly having a support end that is pivotally supported on an internal shoulder of the housing assembly;
 an actuation member carried within the housing for axial movement relative to the housing and the latch assembly;
 a window extending through the housing assembly from an exterior location to an interior location;
 a drive sleeve carried on an outside of the housing for axial movement relative to the housing; and
 a load transfer block carried in the window for axial movement relative to the housing and secured to the actuation member and the drive sleeve so that axial movement of the drive sleeve in a first direction causes the actuation member to pivot the latch segment assembly to a latched position with the external profile on the pin of the adjacent riser pipe.

11. The connection system according to claim 10 further comprising a lock carried by the housing for selectively preventing the drive sleeve from moving in a second direction while the latch segment assembly is in the latched position.

12. The connection system according to claim 10 further comprising a retraction link pivotally carried within the housing in engagement with an end of the latch segment assembly opposite the support end, the retraction link pivoting in response to axial movement of the actuation member in a second direction to disengage the grooved profile of the latch segment assembly from the grooved profile of the pin.

13. The connection system according to claim 10 wherein the latch segment assembly comprises a plurality of separate segments spaced around the housing.

14. The connection system according to claim 10 wherein the actuation member has a curved convex inner side that slides along a curved convex outer surface of the latch segment assembly, said curved surfaces configured such that contact between the curved surfaces is maintained as the actuation member is moved axially in the first direction.

15. The connection system according to claim 10 further comprising a lock carried by the housing for selectively preventing the drive sleeve from moving in a first direction while the latch segment assembly is in an unlatched position.

16. The connector according to claim 10 wherein the window extends transverse to the axis of the housing assembly.

17. A connector for connecting sections of riser pipe, the connector comprising:
 a pin containing an external grooved profile on one end of a first riser pipe;
 a housing assembly on one end of a second riser pipe;
 an internal latch segment assembly carried by the housing assembly with a grooved profile that mates with the grooved profile on the first riser pipe while in an engaged position and spaced from the grooved profile on the first riser pipe while in a disengaged position;
 an actuation sleeve carried by the housing for axial movement in a first direction relative to the latch segment assembly to move the latch segment assembly to the engaged position and in a second direction to move the latch assembly to the disengaged position;
 a split lock ring carried between the sleeve and the housing assembly, the lock ring having a set of grooves that engage a matching set of grooves of the housing assembly in ratcheting engagement; and a backup assembly that selectively prevents the lock ring from ratcheting with the housing assembly.

18. The connector according to claim 17 wherein the backup assembly comprises a plurality of pins mounted in the sleeve for radial movement relative to the sleeve.

19. The connector according to claim 17 further comprising:

a split backup ring encircling the lock ring to prevent ratcheting movement of the lock ring while the backup ring is in the unlocked position; and a plurality of pins mounted in apertures in the sleeve for radial movement, each pin having an inner end that engages the backup ring and an outer end accessible from the exterior of the sleeve for moving the backup ring between the locked and unlocked position.

20. The connector according to claim 19 wherein the backup ring has a grooved profile on an inner diameter that mates to a grooved profile on an inner diameter of the lock ring.

21. The connector according to claim 15 wherein the lock ring grooves are located on an inner diameter of the lock ring and the lock ring is inwardly biased.

22. A connector for connecting sections of riser pipe, the connector comprising:

a latch segment assembly carried by a housing assembly and having a grooved profile that mates with a grooved profile on a pin;

an actuation member carried by the housing assembly for axial movement in a first direction relative to the latch segment assembly to move the latch segment assembly and to force the grooved profile of the latch segment assembly into engagement with the grooved profile of the pin;

a retraction link carried by the housing assembly in engagement with an end of the latch segment assembly, moving in response to axial movement of the actuation member in a second direction to disengage the grooved profile of the latch segment assembly from the grooved profile of the pin;

an actuation member drive assembly adapted to enable the actuation member to be moved axially by an external mechanical force; and wherein the housing assembly comprises a window that extends transverse to a longitudinal axis of the housing assembly and the actuation member drive assembly comprises a coupling member that extends through the window in the housing assembly.

* * * * *